UNITED STATES PATENT OFFICE.

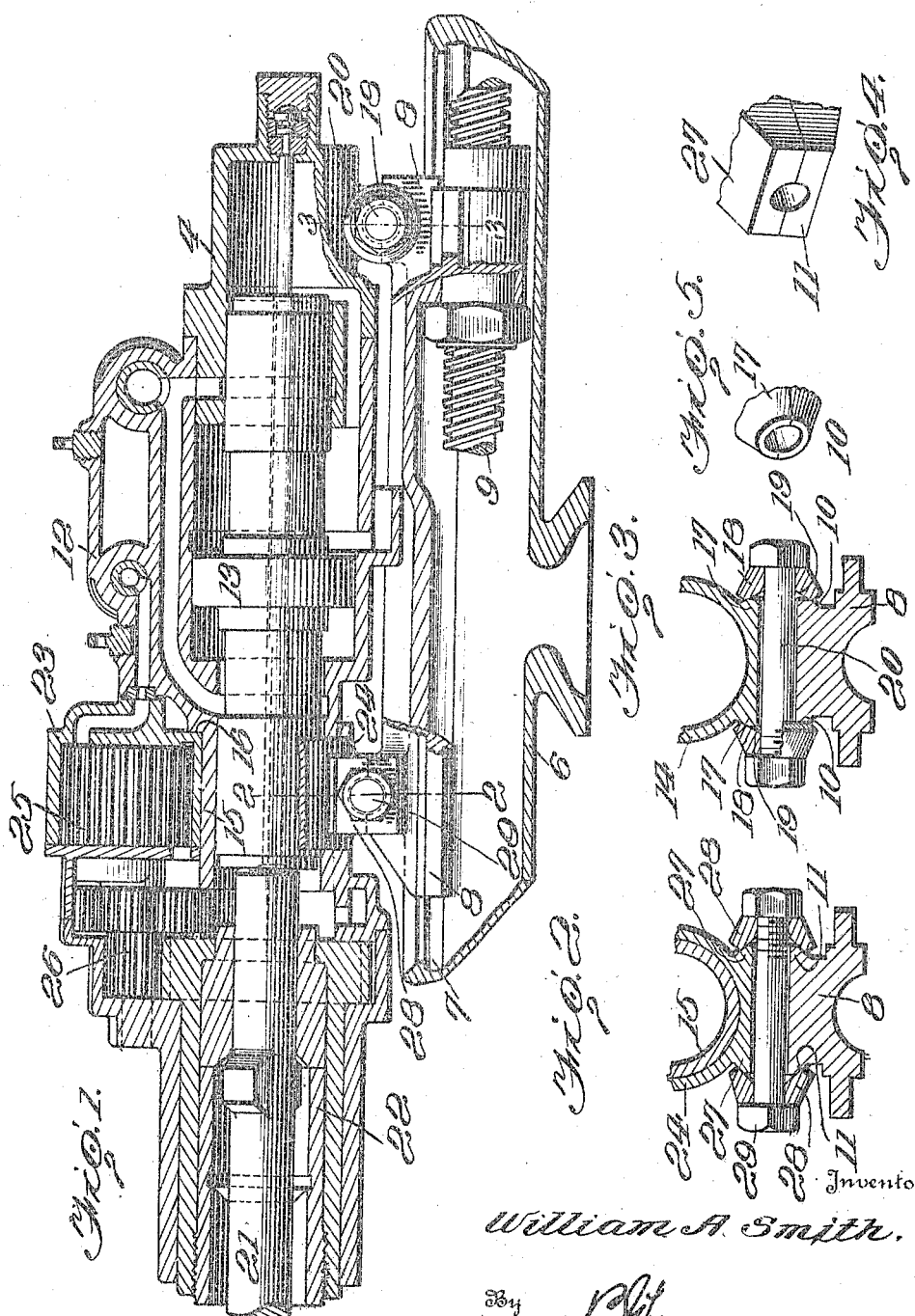

WILLIAM A. SMITH, OF DENVER, COLORADO, ASSIGNOR TO THE DENVER ROCK DRILL MANUFACTURING COMPANY, OF DENVER, COLORADO, A CORPORATION OF DELAWARE.

DRILLING APPARATUS.

1,318,618.      Specification of Letters Patent.      Patented Oct. 14, 1919.

Original application filed March 19, 1917, Serial No. 155,830. Divided and this application filed December 28, 1917. Serial No. 209,319.

*To all whom it may concern:*

Be it known that I, WILLIAM A. SMITH, a citizen of the United States, residing at Denver, in the county of Denver and State of Colorado, have invented certain new and useful Improvements in Drilling Apparatus, of which the following is a specification.

The present invention relates to drilling apparatus, and this is an application constituting a division required by the Patent Office of the invention orginally disclosed and claimed in an application filed by me on March 19, 1917, Serial No. 155,830.

The object of the invention is to provide novel and effective means for securing the drilling mechanism upon its support.

In the accompanying drawings:—

Figure 1 is a vertical longitudinal sectional view through the apparatus,

Figs. 2 and 3 are cross sectional views respectively on the lines 2—2 and 3—3 of Fig. 1, Figs. 4 and 5 are detail perspective views of the front and rear projections on the carriage and drilling mechanism by which the two are secured together.

Similar reference numerals designate corresponding parts in all the figures of the drawings.

In the embodiment illustrated, a suitable support 6 is employed having the usual longitudinal guideways 7 in which is slidably mounted a carriage or cradle 8 that may be adjusted by any desired means, as for example, a feed screw, a portion of which is shown at 9 and has suitable engagement therewith.

The carriage is provided at its rear end with semi-conical opposite projections 10, and is also provided at its front end with outstanding tapered flat-sided projections 11.

Mounted upon the carriage or cradle 8 is the drilling mechanism proper. The same consists of a cylinder member 12 within which reciprocates a hammer piston 13. The cylinder member has a removable rear head 14 and a reduced head 15 which is preferably integral with the barrel of said cylinder, forming an integral shoulder 16.

The rear head 14 is provided with opposite semi-conical projections 17 that are disposed above the projections 10 upon the carriage, and engaged with said projections 10 and 17 are clamping washers 18 having conical sockets 19 that receive the projections 10 and 17. A bolt opening formed between the carriage and rear head 14 receives a transverse bolt 20 that serves to bind the parts in associated relation, and thus clamp the rear end of the drilling motor to the carriage.

The hammer piston is arranged to strike against the rear end of a drill steel, shown at 21, said steel being detachably located in a rotatable drill chuck 22. For the purpose of rotating this chuck, a motor is employed, consisting of a cylinder member 23 removably mounted on the cylinder 12 by means of an integral collar 24 that surrounds the head 15 and is abutted against the shoulder 16. Within the cylinder 23 is a rotary piston mechanism 25 suitably geared as illustrated at 26 to the chuck 22.

The lower side of the collar 24 is provided with outstanding flat-sided tapered projections 27 disposed over the projections 11, and the sets of projections are clamped together by plates 28 having tapered sockets that receive the same. These plates bridge the joint between the carriage 8 and the collar and are held in assembled relation by a tie bolt 29 passing transversely between the collar and carriage and engaged with the plates 28, as clearly shown in Fig. 2.

By having one set of projections, as for example, those in the rear designated 15 and 17 conical, and the other set with flat faces, it will be obvious that while the parts are securely clamped together, the flat faces will permit any relative difference in the relation of the projections and obviate strains that might arise if both sets of projections were conical and the sections thereof were slightly out of proper relation.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or scope of the invention.

Having thus fully described my invention, what I claim as new, and desire to secure by Letters Patent, is:—

1. In apparatus of the character set forth, the combination with a drill actuating motor, of a drill rotating motor removably mounted thereon, means for securing the latter in place on the former, a support for the drill actuating motor, and means engaging the drill rotating motor for securing the drill actuating motor to the support.

2. In apparatus of the character set forth, the combination with a drill actuating motor, of a drill rotating motor having a collar surrounding the drill actuating motor, an adjustable carriage, and means for securing the drill actuating motor to the carriage, including fastening means engaging the collar.

3. In apparatus of the character set forth, the combination with a drill actuating motor, of a drill rotating motor having a collar surrounding the drill actuating motor, an adjustable carriage, clamping devices engaged with the rear end of the drill actuating motor and carriage, and clamping devices engaged with the collar and carriage.

4. In apparatus of the character set forth, the combination with a support having a longitudinal guide way, of a carriage slidably mounted thereon, a drilling motor supported by the carriage, said motor and carriage having outstanding associated projections, and means for securing the motor in fixed relation to the carriage, including clips embracing the corresponding sets of projections.

5. In apparatus of the character set forth, the combination with a support having a longitudinal guide way, of a carriage slidably mounted thereon, a drilling motor supported by the carriage, said motor and carriage having front and rear sets of outstanding projections, securing clips embracing corresponding sets of said projections, and transverse means connecting opposite clips to clamp them upon the projections and thereby fixedly support the motor and carriage.

6. In apparatus of the character set forth, the combination with a drilling motor, of an adjustable carriage therefor, oppositely extending sets of outstanding tapered projections formed upon the motor and carriage, clips embracing the corresponding sets of projections, and transversely disposed bolts connecting opposite clips for drawing the same upon the projections and thereby securing the motor to the carriage.

7. In apparatus of the character set forth, the combination with a drilling motor, of a support therefor, and devices for separately clamping the motor to the support, one of said devices effecting a positive connection between the motor and support to prevent their relative longitudinal movement, the other constituting a frictional clamp to permit their relative movement.

8. In apparatus of the character set forth, the combination with a drilling motor, of a support therefor, said motor and support having sets of coacting substantially conical projections and sets of substantially flat faced projections correspondingly arranged, clips embracing the projections of the respective sets, and means for securing the clips in place.

9. In apparatus of the character set forth, the combination with a support, of a drilling motor mounted thereon, a front set of clips engaging the front portions of the motor and support and bridging the joint between them, transversely disposed holding means engaging said clips, a rear set of clips engaging the rear portions of the motor and support and bridging the joint between them, and transversely disposed holding means engaging said latter clips.

In testimony whereof, I affix my signature in the presence of two witnesses.

WILLIAM A. SMITH.

Witnesses.
S. WILLIAM JOHNSON,
E. L. OLDHAM.